Dec. 7, 1937.　　　　E. H. VICARY　　　　2,101,112
APPARATUS FOR THE UTILIZATION OF THE HEAT OF
FLUE GASES OF A FURNACE TO HEAT A LIQUID
Filed Oct. 19, 1934　　　2 Sheets-Sheet 1
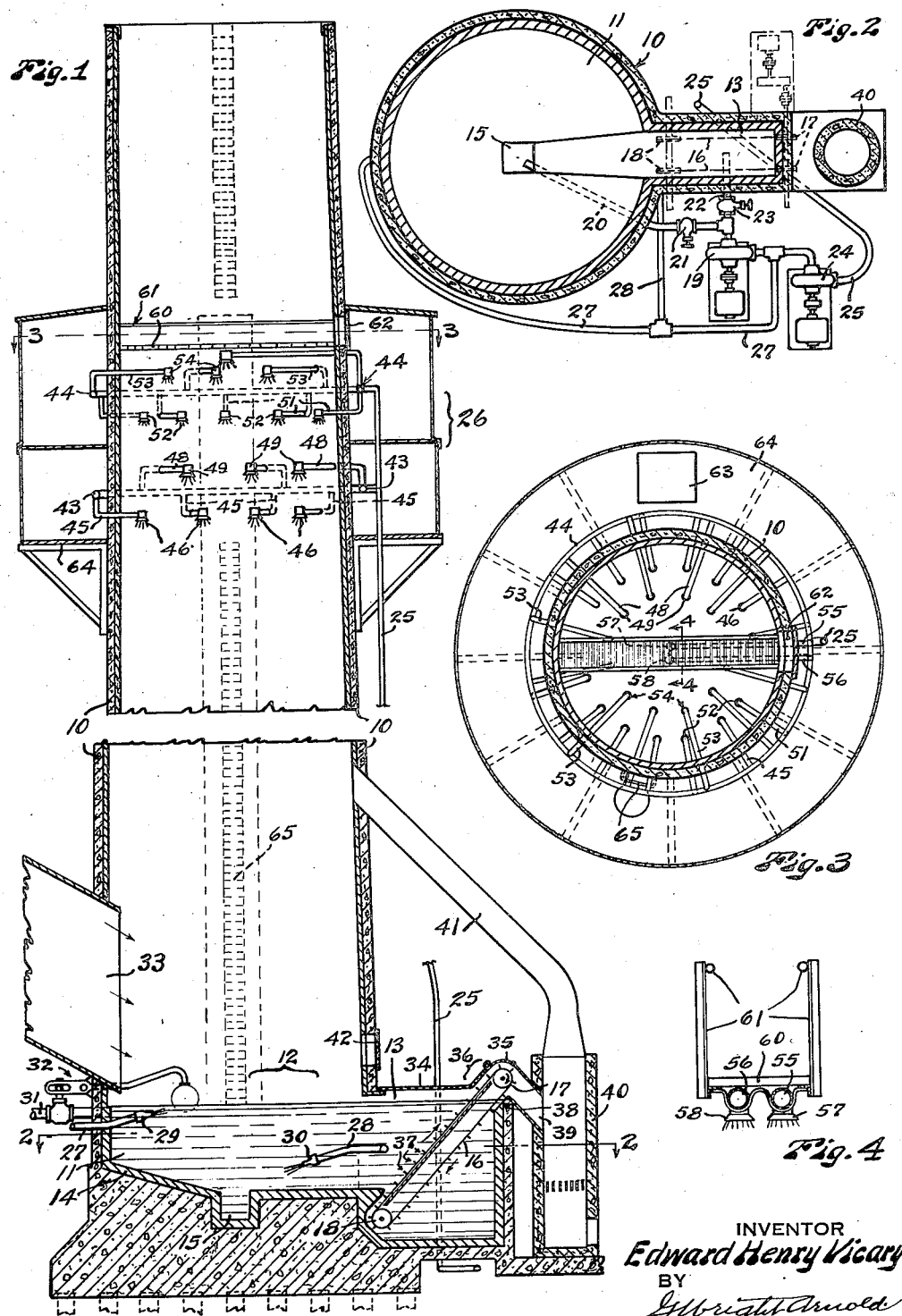
INVENTOR
Edward Henry Vicary
BY
ATTORNEY Dec. 7, 1937.  E. H. VICARY  2,101,112
APPARATUS FOR THE UTILIZATION OF THE HEAT OF
FLUE GASES OF A FURNACE TO HEAT A LIQUID
Filed Oct. 19, 1934  2 Sheets-Sheet 2

INVENTOR
Edward Henry Vicary
BY
Albright Arnold
ATTORNEY

Patented Dec. 7, 1937

2,101,112

UNITED STATES PATENT OFFICE 2,101,112

APPARATUS FOR THE UTILIZATION OF THE HEAT OF FLUE GASES OF A FURNACE TO HEAT A LIQUID

Edward Henry Vicary, Port Angeles, Wash., assignor to Rainier Pulp & Paper Company, San Francisco, Calif., a corporation of Delaware Application October 19, 1934, Serial No. 749,130

6 Claims. (Cl. 159—16)

My invention relates to apparatus for the economical utilization of the heat of flue gases of a furnace to heat a liquid and a device to carry out said process.

More particularly, my invention relates to a device for employing the heat of flue gases for general utility purposes, of which the following are only cited by way of illustration; to concentrate solid matter dispersed in a fluid, to recover chemical agents, and to heat water; and to a device which is characterized by utilizing the flue gases in such a manner that the operation may be continuous and the use of the stack for the discharge of flue gases may be uninterrupted.

For purposes of illustration and definiteness of description by way of disclosure, I will set forth my invention as particularly applied to the concentration for fuel purposes of the solid matters present in waste sulphite liquors resulting from the manufacture of sulphite pulp. However, it is to be distinctly understood that my invention is not to be limited to any such specific application, but extends to any and all applications where like conditions and problems in whole or in part obtain.

Such waste sulphite liquors contain lignin, carbohydrates, calcium oxide combined with lignin sulphonic acid, sulphur dioxide combined with lignin, proteins, rosin and fat and possibly other compounds. When these liquors are concentrated as herein set forth, the solid matter has a fuel value of about 4000 B. t. u. per pound, or in the dry form approximately 8000 B. t. u. By evaporation such waste liquors are reduced to 55% concentration and then they may be efficiently used as fuel. I prefer to have the solids concentrated not to dryness, but to such degree that they may be pumped. This avoids waste and dust in transferring and keeps the solids in a form in which they may be handled most economically, as well as avoid the danger of dust explosion. Of course, the same principles apply to sulphate liquors where the chief purpose of concentrating is the recovery of chemical reagents.

A direct result of my invention is that it provides means for consuming the waste sulphite liquors and thereby overcoming objections commonly obtained to methods heretofore followed, for their disposition. The disposal of the waste liquor of the pulp mills has long presented a problem. Serious public objection often obtains to the discharging of the said waste liquors into rivers or bodies of water. Various methods have been tried to make way with the waste liquors in order to overcome such objections. Extensive pumping systems have been constructed to remove the waste liquors to unobjectionable areas. This involves great continuous expense in pumping, and is a method not possible for many plants, as no such discharging areas are available sufficiently near to the plant to make such method feasible. Also consumption of the waste liquors at the plant has been attempted, but only with partial success. Such consumption presents the difficulty of separating the great percentage of water from the solid parts of the waste liquor, and the cost of evaporating, as heretofore attempted, has been too costly or impractical of operation to be generally adopted.

Moreover, it must be remembered that such flue gases are themselves composed of much solid matter, as carbon ashes or unburnable matter, which in practical operation clog the devices heretofore suggested, and require periodically closing down the plant for the removal of the solid matter.

The separating out of the solid matter is continuous, i. e., some solid matter is separated out on the first descent of the waste liquors, and as the same gradually accumulates it must be separated and removed from the unevaporated portion of the liquid. If the solids appeared or separated out at one time when a certain degree of concentration was developed, the problem would be less difficult, but as a matter of fact, they appear at all stages of the evaporation. My invention overcomes this difficulty so that continuous operation is provided. Manifestly, all devices which require periodic interruption of the operating of the plant are for all practical purposes inoperative, because so far as a pulp mill is concerned, it must have all its parts synchronized to permit continuous operation to meet practical requirements as to cost, uniformity of product, and volume of production.

The various furnaces of the pulp plant supply a volume of hot flue gases which are commonly being conducted to a smoke stack, and there allowed to escape to the upper air currents. My invention and process provides for utilizing such flue gases for the economical concentration of the solids of the waste sulphite liquor or other liquors to a degree which will permit the use of such concentrated liquor as fuel or other purposes, and this while operating continuously.

The primary object of my invention is to provide a device and a process which will achieve all of the purposes and overcome the various objections above mentioned.

Briefly and generally stated, I accomplish my results by preferably supplying the waste sulphite liquid to a reservoir in the bottom portion of a stack or tower, pumping the liquid to an elevated spray means in a tower or stack, permitting the liquid to fall against ascending flue gases, collecting the portion of the liquids unevaporated, separating and removing the solids continuously as they appear as solids, and recirculating the liquid until the degree of concentration desired is reached, and in the preferred form, causing the flue gases to be introduced downwardly into the tower or stack so that they will impinge at an angle upon the surface of the liquids collected after descending against the rising flue gases. Finally when the liquids are concentrated to the degree desired, they are pumped from the reservoir, either directly to the furnace to be consumed or to a storage tank.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a fragmentary view in vertical section of a device embodying my invention, and constitutes one form of device in which the said discovered process may be realized;

Fig. 2 is a view in cross section on line 2—2 of Figure 1;

Fig. 3 is a view in cross section on line 3—3 of Figure 1;

Fig. 4 is a view in vertical section on line 4—4 of Fig. 3;

Figure 5:
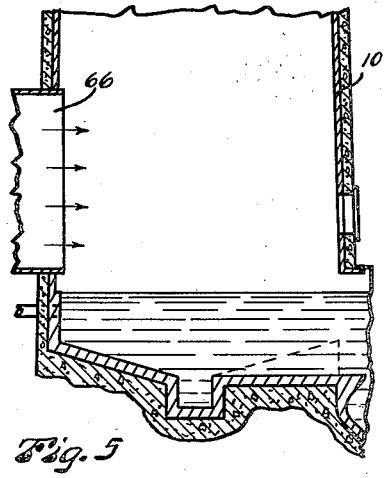
Fig. 5 is a view in vertical section of a modified form showing the horizontally directed flue inlet.

A stack or tower 10 is provided in its bottom portion with a reservoir 11 having a part 12 defined by the perimeter of the base of the stack walls, and a pocket part 13 which extends radially beyond a certain arc portion of the perimeter. The floor 14 of this reservoir part 12 is preferably sloping to form a funnel like base with an axially (of stack) collecting receptacle or sump 15. In part 13 an endless belt elevator 16 having perforated plates to function as a screen for the solid matter is mounted on sprocket wheels 17 and 18. A low pressure pump 19 is connected by clean-out conduit 20 with sump 15 when valve 21 is opened, and with part 13 of the reservoir by conduit 22 when valve 23 is open. Although this pump 19 may serve also to repump the liquors from the reservoir 11 to the spray means, I preferably provide a high pressure pump 24, connected by conduit 25 to the spraying means in the gallery 26, which is positioned in elevated spaced relation to the reservoir 11. High pressure pump 24 is connected with low pressure pump 19 by suitable conduit means. Pump 19 is connected by conduit 27 and branch conduit 28 to agitating spray nozzles 29 and 30, respectively. These nozzles may provide a fan like discharge which functions to cause the liquid in the bottom of the reservoir to flow,—nozzle 30 moving the liquid away from the side on which the pocket 13 is located and nozzle 29 moving the liquid toward the pocket 13. These nozzles 29 and 30 thus provide agitating means as well as means to circulate the liquid. Inlet conduit 31 supplies the waste sulphite liquor to the reservoir 11, liquid level maintaining means 32 automatically controlling the amount supplied. Flue 33 is the inlet for heated flue gases and is preferably downwardly directed in order that the said gases may be discharged in an impinging manner upon the liquid in the reservoir 11.

A metal cover 34 having a hinged lid 35 extends over part 13 of the reservoir, and curves upward over sprocket wheel 17. The portion 36 of the cover is of a length to cover two of the flange members 37 of the endless belt elevator 16 to form a seal against the escape of gases, and likewise inclined wall 38 is provided to form a seal. The cover 34 is preferably formed of yielding material so as to be capable of springing upwardly to some small degree, the better to cooperate with the flanges 37 in forming a seal and to break up chunks of solids which may fall from the stack walls. These become crushed between the cover 34 and the flange 37 of the belt. Chute 39 may conduct the solids removed from the reservoir pocket 13 to a small furnace 40 which has flue 41 leading to stack 10. Of course, the solids would be stored if the purpose of the dehydration is to recover chemical reagents. A door 42 provides access to the bottom portion of the stack.

Figure 8:
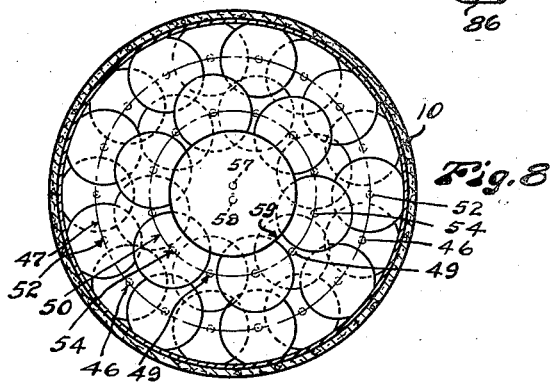
Fig. 8 is a diagrammatic drawing illustrating the overlapping of the cone-shaped spray films.

The spraying means may be formed of pipes 43 and 44 which encircle the stack, the same branching from riser pipe 25. At intervals pipe 43 may have branch conduits 45 with spray nozzles 46 arranged in the circle 47 (see Figs. 1 and 8), and a plurality of branch conduits 48 with nozzles 49 arranged in the circle 50, a circle of lesser diameter than circle 47, so that the spray nozzles are located nearer to the vertical axis of the stock. Similarly at intervals pipe 44 may have a plurality of branch conduits 51 with nozzles 52 arranged in a circle which may be substantially disposed directly above circle 47, and a plurality of branch conduits 53 with nozzles 54 arranged in a circle which may be substantially disposed directly above circle 50. Each nozzle may be designed to form a spray circle of four feet. Nozzles 46 and 52 are off set, with respect to each other, so that their spray cones overlap, and likewise nozzles 47 and 54 are off set, with respect to each other, so that their spray cones overlap. Also the spray cones of circle 50 overlap those of circle 47.

Riser 25 may also have the forked conduits 55 and 56 which have nozzles 57 and 58 located adjacent the center, so as to provide a spray circle having its outer boundary substantially at 59. This results in forming a spray over the entire cross-sectional area of the stack.

Conduits 55 and 56 are preferably carried by a walk 60 of grating bars disposed diametrically in the stack. This walk 60 provides means for suspending a sling rigging to enable an operator to be lowered in the stack for repairs or inspection purposes. Walk 60 may have a railing 61. Access may be had to the walk 60 through door 62 in the stack. For convenience of reaching gallery 26 an opening 63 in the floor 64 is provided for an elevator if desired, while ladder 65 may be secured to the inside of the stack to reach the top.

In the modified form of my invention shown in Fig. 5, the flue 66 is horizontally directed. It conducts the heated gases to the bottom portion of the stack but does not secure the beneficial results obtained by the preferred form, i. e., the downwardly inclined flue 33. However, flue 66 combined with the two part (agitated and quiet) reservoir achieves a part of the advantages of my invention in its most efficient form.

Figure 6:
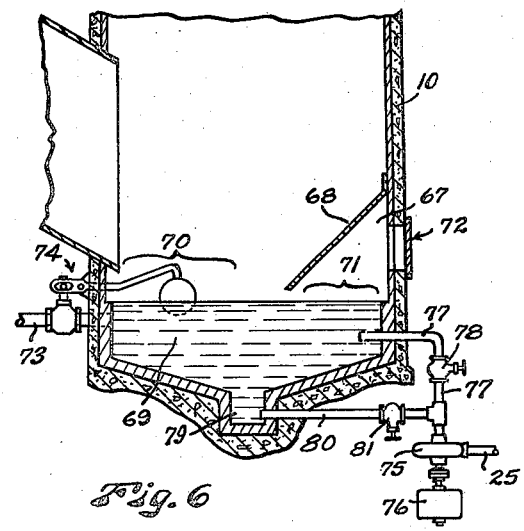
Fig. 6 is a view in vertical section of a modified form particularly illustrating a pocket formed on one side of the stack.

In the modified form, Fig. 6, the pocket 67 is provided within the perimeter of the stack walls by means of shield 68 extending over an arc of the perimeter, and in this wise the reservoir 69 is divided into the agitated portion 70 and the quiet portion 71, wherein the surface is relatively undisturbed. A door 72 affords access to pocket 67 to remove any solids which may collect there. The liquid to be heated is introduced to reservoir 69 through inlet conduit 73 and the rate of flow is controlled by the level maintaining means 74. Pump 75 actuated by motor 76 pumps the liquid from reservoir 69 through conduit 77 having valve 78 to the spraying means formed as in Figure 1. Sump 79 is connected to pump 75 by conduit 80 having valve 81.

This modified form, Fig. 6, is well adapted to heat water. Many industries require large quantities of hot water. After transferring the heat from the flue gases to the water in reservoir 69, this heated water may be used to heat pure water by means of any of the well known heat-transferring devices, such as coils, etc. Since the liquid to be heated by the gases in reservoir 69 may be water in this instance, there will not be the large quantity of solids to remove as in the case of sulphite waste liquors. For the most part, the solids will be those introduced by the flue gases themselves.

Figure 7:
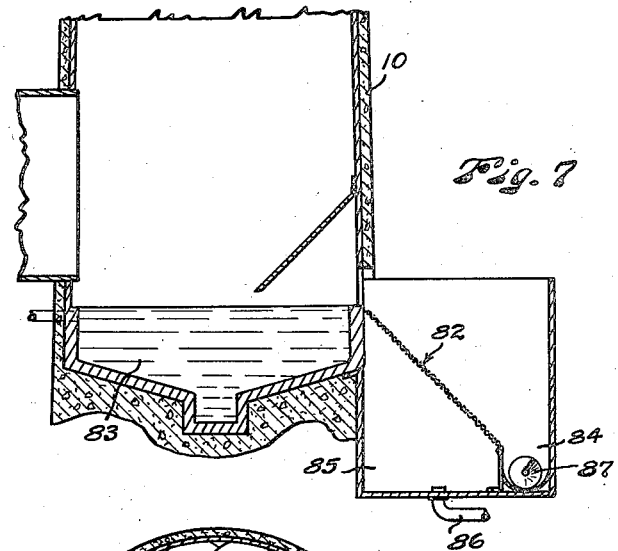
Fig. 7 is a view in vertical section of a modified form of the means for removing the solids.

In the modified form, Fig. 7, a solid-separating and -removing device different from that of Figure 1 is shown. An inclined screen 82, extending from the edge of reservoir 83 to receptacle 84, receives the overflow from the reservoir. The solids descend to receptacle 84, where a screw 87 functions to remove them. The liquid falls through the screen 82, collecting in reservoir 85, from which it may be removed by conduit 86. Other parts may be identical with those previously described. This will serve to illustrate a different type of solid-separating and -removing means.

The mode of operation of the device embodying my invention will be understood for the most part from the above description, which has also set forth in some degree the mode of operation.

By causing the flue gases to impinge, as shown in the preferred form, upon the liquid in the reservoir 11, a directional flow is imparted to the liquid forming the top portion, so that the solids are moved to the quiet area of the reservoir, i. e., to the part forming the pocket 13, from whence the solids may be separated from the liquid and removed. This directional flow may be assisted by agitating means which are preferably in the form of nozzles 29 and 30. The impingement of the heated flue gases upon the liquid in reservoir 11 operates as a bombardment and continuously drives away the evaporated part so that fresh access is had by the heated gases to other portions of the liquid. This results in most efficient operation. The surface is freed of solids, floating particles of carbon, which would otherwise form a layer and blanket the liquid from the heat. The dynamic force of the hot flue gases upon impinging upon the liquid beats up the surface so that it exposes a greatly increased area of the liquid to the gases. Since this surface portion is highly heated, the surface tension of the waste sulphite liquor is reduced and the movement of the solids to the relatively quiet area is facilitated.

Experience has taught that in addition to the gradual but constant collecting or forming of the solids on the surface of the liquid, as the same are released from the sprayed liquid and from the evaporation occurring in the reservoir itself, there may be formed by degrees a layer of solids on the walls of the stack. These solids from time to time break away and fall in the form of chunks to the surface of the liquid in reservoir 11. These are broken as they are carried by flanges 37 of belt 16 against the cover 34.

Manifestly, the device embodying my invention provides for the continuous removal of the solids and hence avoids any shutting down for periodic removing of the same. Where such interruption in operation is necessary to remove the solids, it is obvious that it prevents temporarily the use of the stack. This is a most serious objection, and manifestly my device overcomes such objections. I preferably make use of the stack to secure the elevation for the spraying means and by arranging for the removal of the solids, the normal use of the stack is without interruption. Any attempt to force the flue gases through a circuitous route which involves exposing them to the showered or sprayed liquid and then passing them downwardly against gravity while en route to the stack, results in inefficient operation. My invention avoids this and makes use of the stack to perform the function of serving as a spray tower. A fan (not shown) serves to supply the flue gases to the stack under pressure.

By arranging the spray nozzles as herein shown, the spray is uniformly disposed in the stack cross sectionally considered, so that air pockets are avoided.

Obviously, changes may be made in the forms, dimensions and arrangement of the parts of my invention, without departing from the principle thereof, the above setting forth only preferred forms of embodiment.

I claim:

1. A device for the utilization of the heat of flue gases to heat a liquid embodying a stack; a downwardly inclined flue which directs heated gases downwardly in said stack upon the surface of the liquids to be heated; and a reservoir containing liquids to be heated located in the bottom portion of the stack, said reservoir comprising a portion in which the surface of the liquid to be heated is exposed to the impingement of said downwardly directed flue gases and containing a pocket in which the surface of the liquid to be heated is shielded from impingement of said downwardly directed flue gases, the surface of the liquid in said pocket and said portion being continuous.

2. A device for the utilization of the heat of flue gases to heat a liquid embodying a stack; a flue conducting heated gases to the bottom portion of said stack and directing heated gases upon and at an angle to the surface of liquid to be heated; a reservoir in the bottom portion of the stack, a portion of said reservoir comprising a pocket in which the surface of the liquid to be heated is continuous with the surface of the liquid in said receptacle and is relatively undisturbed; and means for separating and removing solids from the said pocket part of said reservoir.

3. A device for the utilization of the heat of flue gases to heat a liquid embodying a liquid evaporator and condenser stack; a reservoir in the bottom portion of the stack into which the unevaporated and condensed portion of the liquid falls; a downwardly inclined flue which causes heated gases to impinge at an angle upon the liquid to be heated collected in said reservoir, thereby providing a directional flow of the upper portion of the liquid to a predetermined part of the reservoir and concentration of any solids supported on the surface of said liquid; a spray means for the liquid to be heated disposed in elevated position with respect to said reservoir, whereby said liquid, while falling, may be exposed to said gases as the latter are rising in said stack and the unevaporated portion of said liquid may fall into said reservoir; and means for separating and removing said concentrate solids from the liquid in said predetermined part of the reservoir.

4. A device for the utilization of the heat of flue gases to heat a liquid embodying a liquid evaporator and condenser stack; a reservoir in the bottom portion of the stack into which the unevaporated and condensed portion of the liquid falls; a downwardly inclined flue which causes heated gases to impinge at an angle upon the liquid to be heated collected in said reservoir, thereby providing a directional flow of the upper portion of the liquid to a predetermined part of the reservoir and concentration of any solids supported on the surface of said liquid; a spray means for the liquid to be heated disposed in elevated position with respect to said reservoir, whereby said liquid, while falling, may be exposed to said gases as the latter are rising in said stack and the unevaporated portion of said liquid may fall into said reservoir; means for separating and removing said concentrated solids from the liquid in said predetermined part of the reservoir; and a liquid recirculating means returning the liquid in said reservoir to said spray means and to exposure to said gases.

5. In a device for the utilization of the heat of flue gases to heat a liquid, the combination of a stack and a spray means disposed in said stack, said spray means comprising a plurality of downwardly directed nozzles, each of which is adapted to spray liquid over a circular area, a part of which nozzles are disposed in a circle, a part in another circle concentric with and of less diameter than said first mentioned circle and the spray area of the nozzles in one circle overlapping with the spray area of the nozzles in the other circle, another part of said nozzles disposed in like concentric circles but substantially superimposed above said first mentioned circles, and said last mentioned nozzles being disposed in off-set relation with respect to the nozzles of said first mentioned circles.

6. A device for the utilization of the heat of flue gases to heat a liquid embodying a stack; a flue conducting heated gases to the bottom portion of said stack and upon the surface of the liquid; and a reservoir containing liquids to be heated located in the bottom portion of said stack and positioned to have the surface portion thereof swept by flue gases, said reservoir comprising a portion in which the surface of the liquid to be heated is relatively disturbed by said heated gases and a pocket in which the surface of the liquid to be heated is relatively undisturbed by said heated gases and into which said flue gases floatingly urge the surface portion of the liquid, the surface of the liquid in said pocket and said portion being continuous whereby bodies of matter may be floatingly passed from the disturbed portion of the liquid to said pocket.

EDWARD HENRY VICARY.